May 20, 1952  D. U. SHAFFER  2,597,193
JOINT LEAK TESTER
Filed Aug. 2, 1948
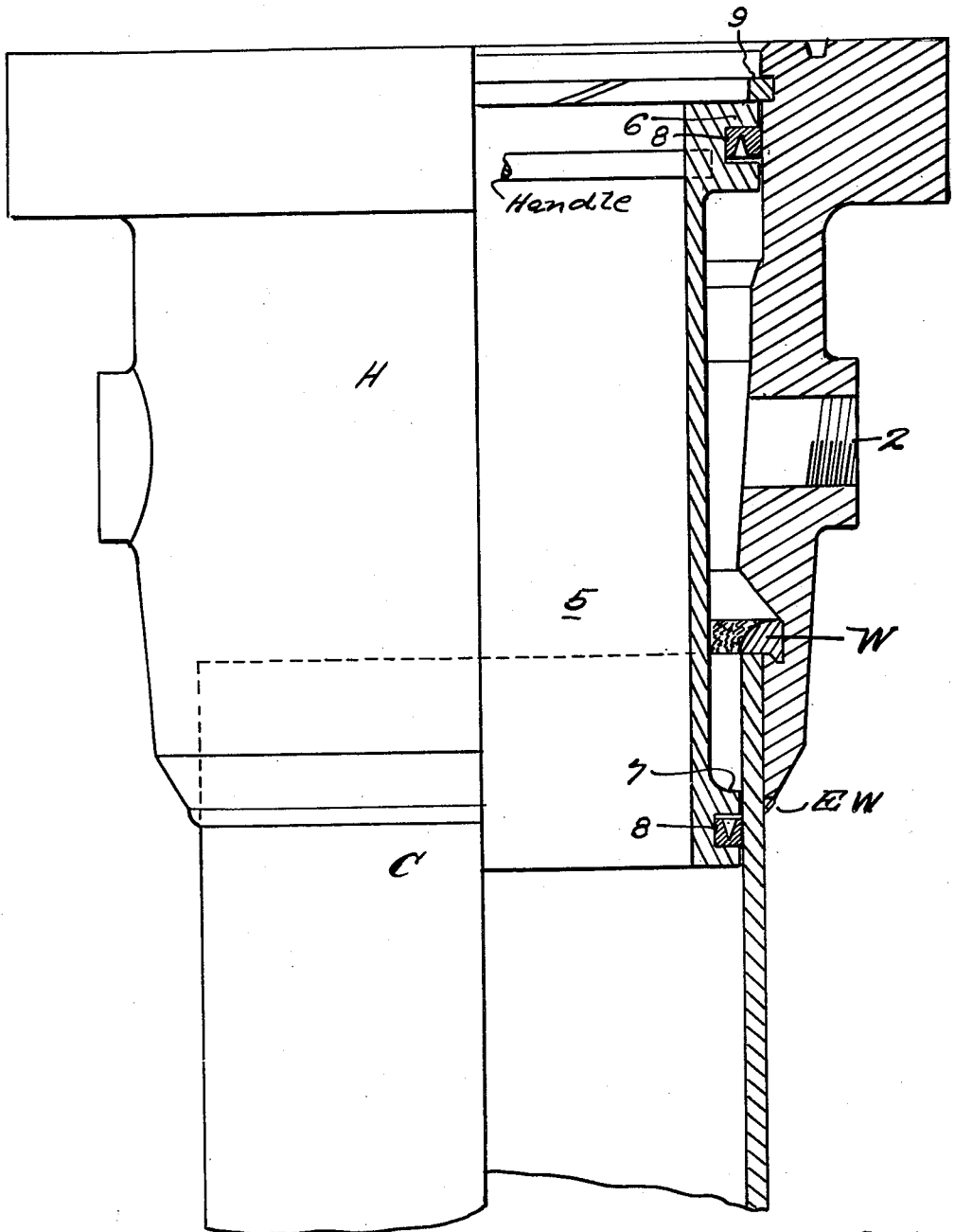
Inventor,
D. U. Shaffer;
By Frederick E. Maynard.
Attorney.

Patented May 20, 1952

2,597,193

UNITED STATES PATENT OFFICE 2,597,193

JOINT LEAK TESTER

Donald U. Shaffer, Brea, Calif., assignor to Shaffer Tool Works, Brea, Calif., a corporation of California Application August 2, 1948, Serial No. 42,025

1 Claim. (Cl. 73—46)

This invention is a handy testing device and apparatus for determining the efficiency of threaded and/or welded joints in the assembly of conduits and fittings in which fluid may travel often under high pressures; particularly as in oil field well equipment.

In many types of assemblies in well drilling and well production equipment pipe, tubes, casing and other parts are jointed to make a sealed connection to and with other parts; such as casing to casing head as here exampled. The joint may be of screw thread type or may be of metal welds. Frequently when the working fluids are pumped to a well or when the natural well fluids begin to flow such joints develop one of more leaks.

It is, therefore, the general aim of this invention to provide a simple, practical, substantial and easily, temporarily installed device whereby to form a test pressure chamber across the joint zone of the connected parts so that fluid pressure may be temporarily set up to show whether the joint may be leaky.

An object is to provide a compact and portable testing unit which can be quickly inserted in a joint assembly in the manner of a plug to make a packing seal in the bore of the assembly and to be removably locked in place against end shift by pressure of the testing fluid; which preferably is a liquid of any desired nature.

Particularly, an object is to provide a joint tester applicable to seal on the bore surface of a casing head to which is jointed one end of a conduit; a section of well casing for example, and to seal on bore surface of the casing at a zone beyond the joint connecting the parts.

The invention consists in certain advancements in this art as set forth in the ensuing disclosure and having, with the above, additional objects and advantages as hereinafter developed, and whose constructions, combinations and details of means, and the manner of operation will be made manifest in the following description of the herewith illustrative embodiment; it being understood that modifications, variations, adaptations and equivalents may be resorted to within the scope, spirit and principles of the invention as it is claimed in conclusion hereof.

The drawing is an elevational, axial section of an embodiment of the invention.

As an adaptation the invention is here incorporated with a deep well casing head H provided with a lateral port 2 for supply of a suitable fluid under pressure to make a leak test of the joint which happens to be connecting casing C, for instance, to the head.

The joint connection may be a threaded one or, as here, shown a metallic weld W up in the bore of the head and at the contiguous top end of the casing. In some instances an external weld EW is made to fortify the connection.

Means are provided whereby to create an inner chamber in the head and casing assembly and to axially opposite sides of the joint or top end of the jointed casing C so that a leak can be tested at every point of the jointing means—threads or welds.

A simple and preferred embodiment is shown as a light weight cylindrical member 5 of hollow body form, in which a simple internal, cross-bar forms a ready handle to facilitate the insertion of the cylinder plug-like, into the bore space of the joined parts.

On the external face of the cylinder 5 are longitudinally spaced beads 6 and 7 in which are sunk peripheral pressure-expanded packing rings 8 designed to press out onto contiguous bore surfaces as the beads shift telescopically into the assembly and when pressure of fluid is set up the packings operate to stop fluid escape thereat.

Though the beads are here of differential maximum diameter to fit the casing bore and the larger bore of the head H, they may be for some installations of the same diameter. In order to prevent upward shift of the installed testing cylinder, due to the said differential beads, a locking ring 9 in the bore of the head laps over the near bead 6; the ring being removable for retracting the cylinder 5 after a test has been finished.

It will be seen that as soon as the testing cylinder has been installed to seat its beads and packing rings 8, one on each axially opposite side of the weld W (the inside weld) then a pressure pipe or hose can be plugged into the port 2 and fluid pressure built up to the desired degree and if there is a defect at any location in the weld W then the fluid (a liquid is preferred) will leak to the exterior of the casing and show deficiency. The weld EW can be made after the test indicates that the joint is good or is made good. A leaky threaded joint will be determined in the same manner and process.

The process consists of creating a chamber bridging the joint to be tested, making the chamber leak tight, building up test fluid in the chamber to the degree desired to effect a detectable flow, if the joint is defective, at the joint, and then removing the testing device.

What is claimed is:

A one-piece jointless casing head tester comprising a cylindrical shell of a diameter approximating that of a respective casing head and having its upper portion substantially seating on the upper bore of said head, said shell being recessed peripherally and longitudinally to form shoulders between which is formed a fluid pressure chamber extending beyond each side of a welded pipe joint inset head when the shell is installed, the lower end of the head telescopically fitting on the upper end of the welded pipe, and fluid pressure packing rings arranged in the peripheral recesses of the upper and lower portions of the shell and extending beyond the outer peripheral faces of the shoulders, said packing rings each being provided with a groove in the side wall facing the pressure chamber whereby the packing rings will be forced radially into sealing contact by the pressure of the fluid in said chamber.

DONALD U. SHAFFER.

REFERENCES CITED

The following references are of record in the file of this patent:

UNITED STATES PATENTS

| Number | Name | Date |
| --- | --- | --- |
| 2,241,526 | Rosenkranz | May 13, 1941 |
| 2,401,856 | Brock | June 11, 1946 |
| 2,478,628 | Hansen | Aug. 9, 1949 |
| 2,481,013 | Henderson | Sept. 6, 1949 |